United States Patent [19]
Okada

[11] 3,908,928
[45] Sept. 30, 1975

[54] SEAT BELT DEVICES FOR AUTOMOBILES AND THE LIKE

[75] Inventor: Motohiro Okada, Tokyo, Japan

[73] Assignee: Honda Giken Kogyo Kabushiki Kaisha, Tokyo, Japan

[22] Filed: Feb. 8, 1974

[21] Appl. No.: 440,811

Related U.S. Application Data

[63] Continuation-in-part of Ser. No. 253,595, May 15, 1972, abandoned.

[52] U.S. Cl. ....... 242/107.4; 242/107.6; 280/150 SB
[51] Int. Cl.² ................... A62B 35/00; B65H 75/48
[58] Field of Search ...................... 242/107.4, 107.6; 280/150 SB; 297/388; 180/82 C; 200/61.58 B

[56] References Cited
UNITED STATES PATENTS

| | | | |
|---|---|---|---|
| 3,172,700 | 3/1965 | Haas | 297/388 |
| 3,266,842 | 8/1966 | Board et al. | 297/388 |
| 3,294,339 | 12/1966 | Fontaine | 242/107.4 |
| 3,825,205 | 7/1974 | Takada | 242/107.4 |

*Primary Examiner*—John W. Huckert
*Assistant Examiner*—John M. Jillions
*Attorney, Agent, or Firm*—Waters, Schwartz & Nissen

[57] ABSTRACT

A self-winding type seat belt device which is used without imparting to the user any sense of pressure such as previously caused by the belt tension. The device includes a winding drum which is automatically held against rotation in the winding direction when the seat belt joint is connected. The drum further is held against rotation in the opposite or unwinding direction when the belt is subsequently drawn out, thereby enabling the device fully to serve its intended purpose.

4 Claims, 4 Drawing Figures

SEAT BELT DEVICES FOR AUTOMOBILES AND THE LIKE

This application is a Continuation-in-Part Application of Ser. No. 253,595 now abandoned; filed May 15, 1972.

FIELD OF THE INVENTION

The present invention relates to seat belt devices for automobiles and the like.

DESCRIPTION OF THE PRIOR ART

Seat belt devices of the self-winding type have been previously known, which include a cylindrical drum or the similar element which is spring-biased so as to wind up the seat belt thereon, with the purpose of enabling the user to pull on the seat belt with ease. Such devices, however, are disadvantageous in that the seat belt in use is always held pressed against the user's body under the biasing action of the spring, and thereby causing constant discomfort to the user.

SUMMARY OF THE INVENTION

Accordingly, the present invention has for its object the provision of a novel seat belt device of the self-winding type, which is designed whereby the seat belt may be readily pulled out or extended for use as in the case of conventional self-winding type seat belt devices, and in which the inventive seat belt thus pulled out may be maintained free of any winding effect so as to avoid imparting to the user any sense of pressure and to thereby enable him to use the device with ease and comfort.

The above and other objects and advantages of the present invention will become apparent from the following description, reference being had to the accompanying drawing showing a preferred embodiment by way of example, of the seat belt device of the present invention.

DETAILED DESCRIPTION

Figure 1:
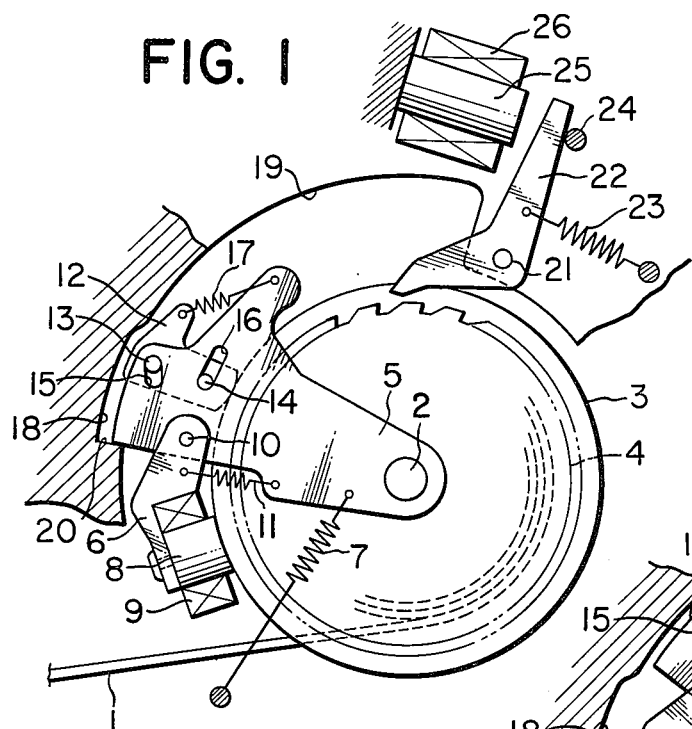
FIG. 1 is a side view of the device embodying the present invention, showing the relationship between the components thereof prior to the seat belt being worn by a user.

Referring to the drawing, the device includes a support shaft 2 suitably supported, for example, on the seat structure of an automobile. The shaft has fixedly mounted thereon a ratchet wheel 4 and a cylindrical body or drum 3, the latter of which is provided with self-winding means of known type, and which is operable to wind up the seat belt 1 when the latter is released. A first rocker arm 5 is mounted on the support shaft 2 for rocking movement relative thereto, a tension spring 7 being arranged between the first rocker arm 5 and a fixed part of the seat structure so as to bias the rocker arm 5 in a counterclockwise direction, as viewed in the drawing.

A second rocker arm 6 is pivotally connected to the first rocker arm 5 on one side thereof by means of a pivot pin 10. An electromagnet 8 including a coil 9 is fixed to the second rocker arm 6 in a position adapted to be pressed against the outer periphery of the cylindrical body 3 when the electromagnet is energized. A tension spring 11 is arranged between the first and second rocker arms 5 and 6 and normally urges the second rocker arm 6 to rotate about the axis of pivot pin 10 in the counter-clockwise direction, as viewed in the drawing. Additionally, the first rocker arm 5 carries at its radially outer end a cam member 12, which is mounted on the arm 5 in generally parallel relation thereto with its radially inner cam surface being in contact with the outer periphery of the cylindrical body 3.

The cam member 12 has two spaced pins 13 and 14 secured thereto and projecting from the sides thereof so as to slidably fit into respective elongate slots 15 and 16 which are formed in the first rocker arm 5. Thus, the cam member 12 is rockable relative to the first rocker arm 5 within the extent of sliding movement of the pins 13 and 14 along the respective elongate slots 15 and 16. A tension spring 17 is arranged between the first rocker arm 5 and the cam member 12 for biasing the latter in the clockwise direction, as viewed in the drawing.

Figure 2:
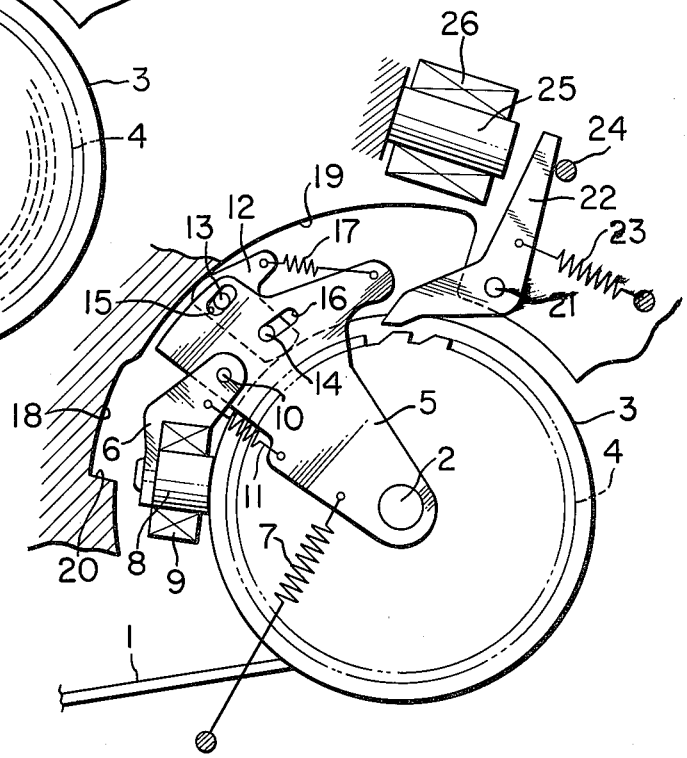
FIG. 2 is a view similar to FIG. 1, showing the relationship of the components subsequent to the seat belt being put on by a user, and illustrating the self-winding means being withheld so as to maintain the seat belt in its pulled-out or extended reference position.
Figure 3:
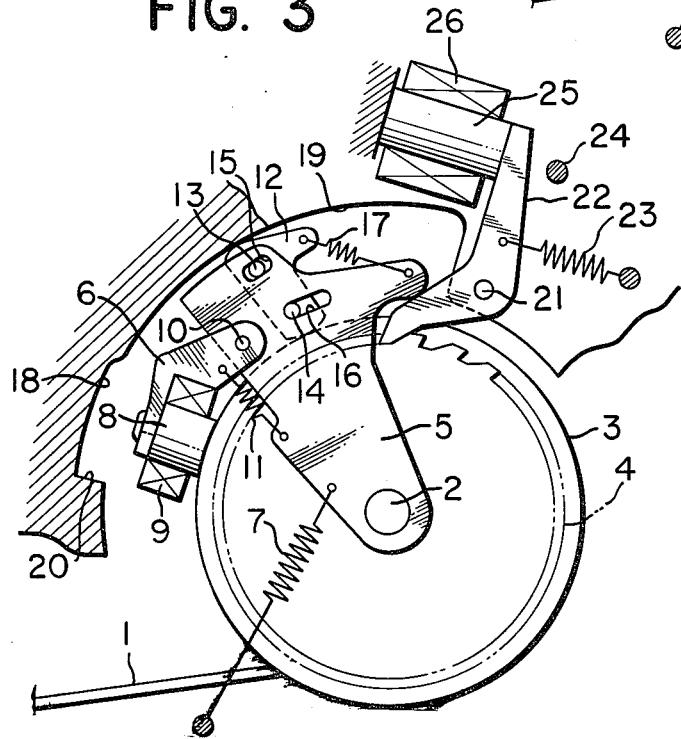
FIG. 3 is a view similar to FIGS. 1 and 2, showing the state of the device in which the seat belt is held against any further extension.

The seat structure includes an arcuate wall surface 18 and another arcuate wall surface 19, both of which extend about the axis of the support shaft 2 in spaced apart positions relative to the outer periphery of the cylindrical drum 3. The arcuate surface 19, which continues from the arcuate surface 18, has a radius slightly smaller than that of the arcuate surface 18, the latter being provided with a shouldered formation 20 at its opposite end. As illustrated in FIG. 1, the arcuate surface 18 is formed so as to be slightly spaced apart from the radially outer cam surface of the cam member 12, while the arcuate surface 19 is formed so that it may come into contacting engagement with the outer cam surface of the cam member 12, as shown in FIGS. 2 and 3. The shouldered formation 20 serves to limit the counterclockwise rotation of the first rocker arm 5 caused by the biasing force of tension spring 7.

A pawl member 22 is pivotally secured at a fixed location adjacent to the remote end of the arcuate wall surface 19 by means of a pivot pin 21 for cooperative engagement with the teeth of the ratchet wheel 4. A tension spring 23 is arranged between the pawl member 22 and the seat structure for biasing the pawl member 22 clockwise, i.e., in a direction disengaging it from the ratchet wheel 4. A stop 24 is provided for limiting the clockwise rocking movement of the pawl member 22.

A fixed electromagnet 25 including coil 26 is arranged opposite of the outer end of the pawl member 22, which is illustrated as a two-armed lever. Upon energization, the electromagnet 25 attracts the pawl member 22 so as to rock it counterclockwise into engagement with an adjacent one of the teeth of the ratchet wheel 4.

Figure 4:
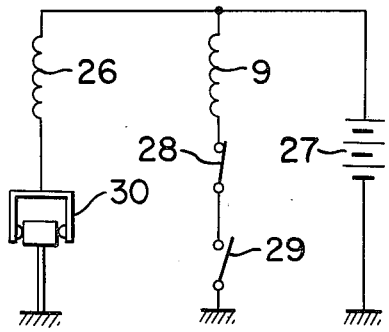
FIG. 4 is a diagram showing the electric circuit arrangement for operating the electromagnets of the device.

FIG. 4 diagrammatically illustrates the circuit arrangement for operating the electromagnets 8 and 25, including respective coils 9 and 26. As shown in the circuit, the power source 27 and coil 9 are connected to a main switch 28 and to a limit switch 29 which is closed when the seat belt, which is pulled out for use, is connected by means of an appropriate disconnecting joint fastened to the belt end. Connected in the circuit, including the power source 27 and coil 26, is a sensor 30 which is closable upon a collision force being experienced by the automobile equipped with the present device.

The operation of the device described above is now described with reference to FIG. 1, which illustrates the relationship of the components thereof before the user puts on the seat belt, or immediately after the user has put it on. As shown, the first rocker arm 5 is held in engagement with the shoulder portion 20 under the bias of tension spring 7 with the outer cam surface of the cam member 12 being spaced from the arcuate wall surface 18, and with the movable electromagnet 8 being in the de-energized state. This will enable the user to freely pull the seat belt 1 out of the cylindrical body 3 by drawing the belt in opposition to the force of the self-winding means, thereby rotating the cylindrical body 3 clockwise together with the support shaft 2. The seat belt 1 pulled out in this manner to a suitable extent may then be securely connected by the user through the medium of the disconnecting joint attached to the belt end.

At the instant of the belt connection, the limit switch 29 shown in FIG. 4 is closed, as described hereinbefore, so that the electromagnet 8 including coil 9 is energized to thereby come into pressure contact with the outer periphery of the cylindrical body 3, and fixing the second rocker arm 6 carrying the electromagnet 8 to the cylindrical body 3. In this operative state, when the seat belt 1 is drawn out still further, the cylindrical body 3 is rotated in conjunction with the first and second rocker arms 5 and 6 as an integral unit, thereby assuming the position shown in FIG. 2, in which the cam member 12 is confined between the arcuate wall surface 19 and the outer peripheral surface of the cylindrical body 3, while respectively engaging the outer and inner camming surfaces of the cam member 12 so that the seat belt 1 cannot be drawn further into the cylindrical body 3 under the effect of the self-winding means, even if the seat belt 1 is relieved of any external pull.

Further, when the seat belt 1 thus worn on the user's body is additionally slightly drawn out to make it loose, the first rocker arm 5 having a forward projection is correspondingly driven clockwise into engagement with the pawl member 22, which in turn is rocked counterclockwise into engagement with an adjacent one of the teeth of the ratchet wheel 4 so that the seat belt 1 is completely checked or prevented from being drawn out any further. The device now serves its intended purpose of protecting the user in case of emergency.

Should the automobile equipped with the device come into collision while the device is in the operative state shown in FIG. 2 or when the user is wearing the seat belt 1 in a manner whereby the belt may be drawn out slightly further, the sensor 30, as shown in FIG. 4, is closed to energize the coil 26 and consequently the electromagnet 25 acts to attract the pawl member 22, causing the latter to rotate counterclockwise into engagement with the adjacent one of the teeth of the ratchet wheel 4. This causes the seat belt 1 to be completely checked or prevented from being further extended or drawn out.

The operation of the seat belt device is now described as follows:

After closing the main switch 28, a user, in order to put on the seat belt, pulls it out to extend around his body, and then buckles the belt. At this instant, the limit switch 29 is automatically closed and the first electric circuit, including the electric source 27, coil 9, main switch 28 and limit switch 29 is also closed so as to start electric current to flow through the electric circuit, thereby energizing the first electromagnet 8 to attract the outer peripheral surface of the drum 3 into fixed connection therewith. In this physical state, upon rotation of the drum 3, the first electromagnet 8, second rocker arm 6 and first rocker arm 5 are integrally rotatable therewith as a unit. As a result, if the user draws the seat belt further out for adjustment of the looseness thereof, the drum 3 is rotated clockwise or in the belt-slackening direction until the first rocker arm 5 engages with the pawl member 22 to rotate it counterclockwise about the pivot pin 21 so that the pawl member 22 comes into meshing engagement with the adjacent one of the ratchet teeth of the gear wheel 4. This engagement of the gear wheel 4 with the pawl member 22 is maintained thereafter, since the cam member 12 prevents the rotation of the drum 3 in the belt-winding direction.

At this stage, it is noted that the seat belt is drawn out for a definite or predetermined length, but cannot be extended any further.

If the user wishes to make the belt either more loose or tighter, he can do so only by opening the main switch 28. When he again closes the main switch 28, after the seat belt has been drawn out or retracted to a suitable length, the device returns to the previously mentioned operative state or, in other words, the drum 3 again becomes locked against rotation thereof in the same manner as previously described.

The sensor 30 and the coil 26 constitute the second electric circuit, which is connected to the first electric circuit in parallel relationship therewith. The sensor 30 is normally inoperative, but is actuated only by considerably large impactive forces generated by collisions of automobiles which are equipped with this seat belt device, irrespective of whether the first electric circuit is closed or not. Therefore, the second electric circuit is normally opened, but is closed only in the case of traffic accidents such as collisions and the like, and hence the second electromagnet 25 including the coil 26 is energized only in such cases so as to attract and actuate the pawl member 22 into meshing engagement with the adjacent ratchet tooth of the gear wheel 4, and thereby locking the drum 3 against rotation. Since the sensor 30 and the second electromagnet 25 are primarily provided for precautionary purposes, they may be left out, in use, from the seat belt device.

As is apparent from the foregoing description, there is provided according to the present invention a novel, effective and comfortable seat belt device of the self-winding type in which the seat belt can be freely extended or pulled out for use in quite the same manner as in previous self-winding seat belt devices, and the self-winding function of which is signally suspended upon connection of the seat belt, usually extended. The belt connection is also effective in determining a position of reference extension for the seat belt, and beyond this position the seat belt is extensible normally in only a predetermined amount permissible for its proper functioning. Accordingly, it will be readily appreciated that the seat belt device of the present invention may be used comfortably without imparting any sense of pressure to the user and with a high degree of utilization contributing toward traffic safety.

While a particular embodiment of the present invention has been shown and described, it will be obvious to those skilled in the art that it is not so limited but is susceptible of various changes and modifications without departing from the spirit and scope of the invention as defined in the appended claim.

What is claimed is:

1. A seat belt for automobiles and the like and of the type including a spring-biased rotatable drum for automatically winding up the seat belt, comprising: a gear wheel formed on one side of said drum; a pawl member pivotally fastened to a seat structure for cooperative engagement with said gear wheel; spring means normally biasing said pawl member out of engagement with said gear wheel; means including electrical actuating means forming a closed electrical circuit upon buckling of said seat belt; a rocker arm rotatably mounted on said drum; drum locking means being supported on said rocker arm for making a fixed connection between said rocker arm and said drum responsive to said electrical actuating means upon closing of said electrical circuit, for locking said rocker arm in rotation with said drum, said rocker arm further including means thereon for pivotally moving said pawl into engagement with said gear wheel upon actuation of said drum locking means and subsequent withdrawal of said seat belt, thereby preventing said seat belt from being drawn out in excess of a predetermined length.

2. A device as claimed in claim 1, comprising a cam member articulated on said rocker arm and being adapted to engage the surface of said drum and a surface on said seat structure for preventing winding-up of said drum.

3. A device as claimed in claim 1, said means for making a fixed connection between said rocker arm and said drum comprising an electromagnet pivotally mounted on said rocker arm.

4. A device as claimed in claim 1, comprising a second electromagnet for actuating said pawl member into engagement with said gear wheel; and sensor means operable in response to large impactive forces generated upon collision accidents adapted to energize said second electromagnet.

* * * * *